US011140126B2

(12) United States Patent
Koike

(10) Patent No.: US 11,140,126 B2
(45) Date of Patent: Oct. 5, 2021

(54) COMMUNICATION APPARATUS, COMMUNICATION SYSTEM, MAIL SERVER, AND NON-TRANSITORY COMPUTER READABLE MEDIUM

(71) Applicant: FUJIFILM BUSINESS INNOVATION CORP., Tokyo (JP)

(72) Inventor: Masamichi Koike, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 157 days.

(21) Appl. No.: 16/389,282

(22) Filed: Apr. 19, 2019

(65) Prior Publication Data
US 2020/0195605 A1 Jun. 18, 2020

(30) Foreign Application Priority Data
Dec. 14, 2018 (JP) .............................. JP2018-234427

(51) Int. Cl.
*H04L 29/12* (2006.01)
*H04L 12/46* (2006.01)

(52) U.S. Cl.
CPC ...... *H04L 61/1564* (2013.01); *H04L 61/2007* (2013.01); *H04L 61/2076* (2013.01); *H04L 61/2514* (2013.01); *H04L 12/4641* (2013.01); *H04L 61/6072* (2013.01)

(58) Field of Classification Search
CPC ............. H04L 61/1564; H04L 61/6072; H04L 61/2514; H04L 61/2076; H04L 61/2007; H04L 12/4641
See application file for complete search history.

(56) References Cited

U.S. PATENT DOCUMENTS

| | | | | |
|---|---|---|---|---|
| 6,678,835 | B1 * | 1/2004 | Shah | H04L 41/0233 |
| | | | | 714/4.12 |
| 7,154,891 | B1 * | 12/2006 | Callon | H04L 29/12009 |
| | | | | 370/392 |
| 7,483,437 | B1 * | 1/2009 | Mohaban | H04L 63/029 |
| | | | | 370/400 |
| 7,523,197 | B2 * | 4/2009 | Castaneda | H04L 67/025 |
| | | | | 709/224 |
| 8,185,613 | B2 * | 5/2012 | Xie | H04L 63/1408 |
| | | | | 709/220 |
| 8,595,495 | B2 * | 11/2013 | Mayer | H04N 1/32016 |
| | | | | 713/170 |

(Continued)

FOREIGN PATENT DOCUMENTS

| | | |
|---|---|---|
| JP | 2002-305531 A | 10/2002 |
| JP | 2007-18479 A | 1/2007 |
| JP | 2010-200285 A | 9/2010 |

*Primary Examiner* — Patrice L Winder
*Assistant Examiner* — Angela M Widhalm de Rodriguez
(74) *Attorney, Agent, or Firm* — Oliff PLC

(57) ABSTRACT

A communication apparatus is connected to a communication line by using a dynamically-set global Internet-Protocol address and includes a detector and a transmitting unit. The detector detects a change in the global Internet-Protocol address. The transmitting unit transmits the changed global Internet-Protocol address to a mail server when the detector detects the change in the global Internet-Protocol address, so that the changed global Internet-Protocol address is registered in an Internet-Protocol-address limiting function of the mail server.

9 Claims, 15 Drawing Sheets

(56) References Cited

U.S. PATENT DOCUMENTS

| | | | | |
|---|---|---|---|---|
| 8,880,614 B1* | 11/2014 | Greenberg | H04L 51/12 | 709/206 |
| 2004/0004968 A1* | 1/2004 | Nassar | H04L 69/14 | 370/401 |
| 2004/0028035 A1* | 2/2004 | Read | H04L 61/2535 | 370/352 |
| 2004/0034695 A1* | 2/2004 | Touch | H04L 61/2061 | 709/209 |
| 2004/0252683 A1* | 12/2004 | Kennedy | H04L 29/06 | 370/389 |
| 2005/0105513 A1* | 5/2005 | Sullivan | G06F 16/955 | 370/352 |
| 2005/0174937 A1* | 8/2005 | Scoggins | H04M 7/006 | 370/230 |
| 2005/0204060 A1* | 9/2005 | Maekawa | H04L 61/2578 | 709/245 |
| 2005/0210292 A1* | 9/2005 | Adams | H04L 29/06027 | 726/5 |
| 2007/0047585 A1* | 3/2007 | Gillespie | H04L 61/2567 | 370/475 |
| 2007/0217408 A1* | 9/2007 | Sahashi | H04L 45/00 | 370/389 |
| 2009/0028167 A1* | 1/2009 | Takeda | H04L 61/2575 | 370/401 |
| 2010/0077037 A1* | 3/2010 | Turakhia | H04L 61/1564 | 709/206 |
| 2010/0208620 A1* | 8/2010 | Qian | H04L 41/0869 | 370/255 |
| 2010/0211783 A1* | 8/2010 | Lukaszyk | H04L 63/10 | 713/168 |
| 2011/0302647 A1* | 12/2011 | Bhattacharya | H04L 41/0813 | 726/11 |
| 2012/0117239 A1* | 5/2012 | Holloway | H04L 61/1511 | 709/226 |
| 2013/0103819 A1* | 4/2013 | Meyer | H04L 61/2076 | 709/223 |
| 2014/0282936 A1* | 9/2014 | Fitzgerald | H04L 41/0809 | 726/6 |
| 2015/0040238 A1* | 2/2015 | Sarsa Sarsa | G06F 21/60 | 726/26 |
| 2015/0180823 A1* | 6/2015 | Zheng | H04L 61/6059 | 709/245 |
| 2016/0072766 A1* | 3/2016 | Jain | H04L 61/2532 | 709/228 |

* cited by examiner

COMMUNICATION APPARATUS, COMMUNICATION SYSTEM, MAIL SERVER, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-234427 filed Dec. 14, 2018.

BACKGROUND

(i) Technical Field

The present disclosure relates to communication apparatuses, communication systems, mail servers, and non-transitory computer readable media.

(ii) Related Art

Japanese Unexamined Patent Application Publication No. 2002-305531 discloses providing a network technology that allows a user to operate a server in accordance with a dynamic Internet-Protocol (IP) address by automatically registering the dynamic IP address in a predetermined domain name system (DNS) according to an allocation. In this technology, an address-allocation detecting and registering unit detects that the dynamic IP address is allocated as a client system and notifies a dynamic DNS server system of the IP address via the Internet. In the dynamic DNS server system, an authenticating and DNS-updating unit of an operation management server authenticates a server box of a transmission source with respect to an IP address reported from the server box, and registers the IP address in the DNS as an IP address corresponding to a predetermined domain name, which corresponds to the server box that has passed the authentication.

Japanese Unexamined Patent Application Publication No. 2010-200285 discloses controlling transmission of malicious or risky electronic mails from indiscriminate electronic-mail-based attacks or from unsolicited electronic mail transmitters in an Internet mail system. Specifically, a mechanism is realized for controlling exchanging of electronic mails between electronic mail servers by using the system, limiting communicable electronic mail servers, and refusing electronic mails from domains other than legitimate Internet domains. Moreover, reception of electronic mails from nonsubscribers may also be refused in accordance with a policy set by a subscriber, so that transmission of electronic mails directly from a nonsubscriber's electronic mail server to a subscriber's electronic mail server is not possible, thereby realizing safer communication between electronic mail servers.

Japanese Unexamined Patent Application Publication No. 2007-018479 discloses a technology that enables transmission and reception of a message mail, a memo mail for each location, or an arrival notification mail at an optimal timing by performing the transmission and reception based on positional information when using an electronic mail. Specifically, this technology involves determining the usage location from a media access control (MAC) address of a default gateway that is necessary when connecting to a network, accessing a dedicated server from a terminal (such as a personal computer (PC), a personal digital assistant (PDA), a wireless local-area-network (LAN) containing portable telephone, an Internet-Protocol (IP) portable telephone, or a gaming device) when connected to the network, and transmitting authentication information together with positional information to a server, thereby allowing for exchanging of an electronic mail suitable for the usage location.

Some mail servers have an IP-address limiting function for limiting the connection sources of electronic mails to permit exchanging of electronic mails only in a predetermined location (such as a location of a corporation) (or not to permit exchanging of electronic mails from locations other than the predetermined location). However, in this IP-address limiting function, the IP addresses subject to the limiting function are fixed global IP addresses and do not include dynamically-set global IP addresses.

SUMMARY

Aspects of non-limiting embodiments of the present disclosure relate to providing a communication apparatus, a communication system, a mail server, and a non-transitory computer readable medium in which exchanging of an electronic mail is performable only in a predetermined location even when a dynamically-set global IP address is used.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a communication apparatus connected to a communication line by using a dynamically-set global Internet-Protocol address and including a detector and a transmitting unit. The detector detects a change in the global Internet-Protocol address. The transmitting unit transmits the changed global Internet-Protocol address to a mail server when the detector detects the change in the global Internet-Protocol address, so that the changed global Internet-Protocol address is registered in an Internet-Protocol-address limiting function of the mail server.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below with reference to the drawings.

First Exemplary Embodiment

Figure 1:
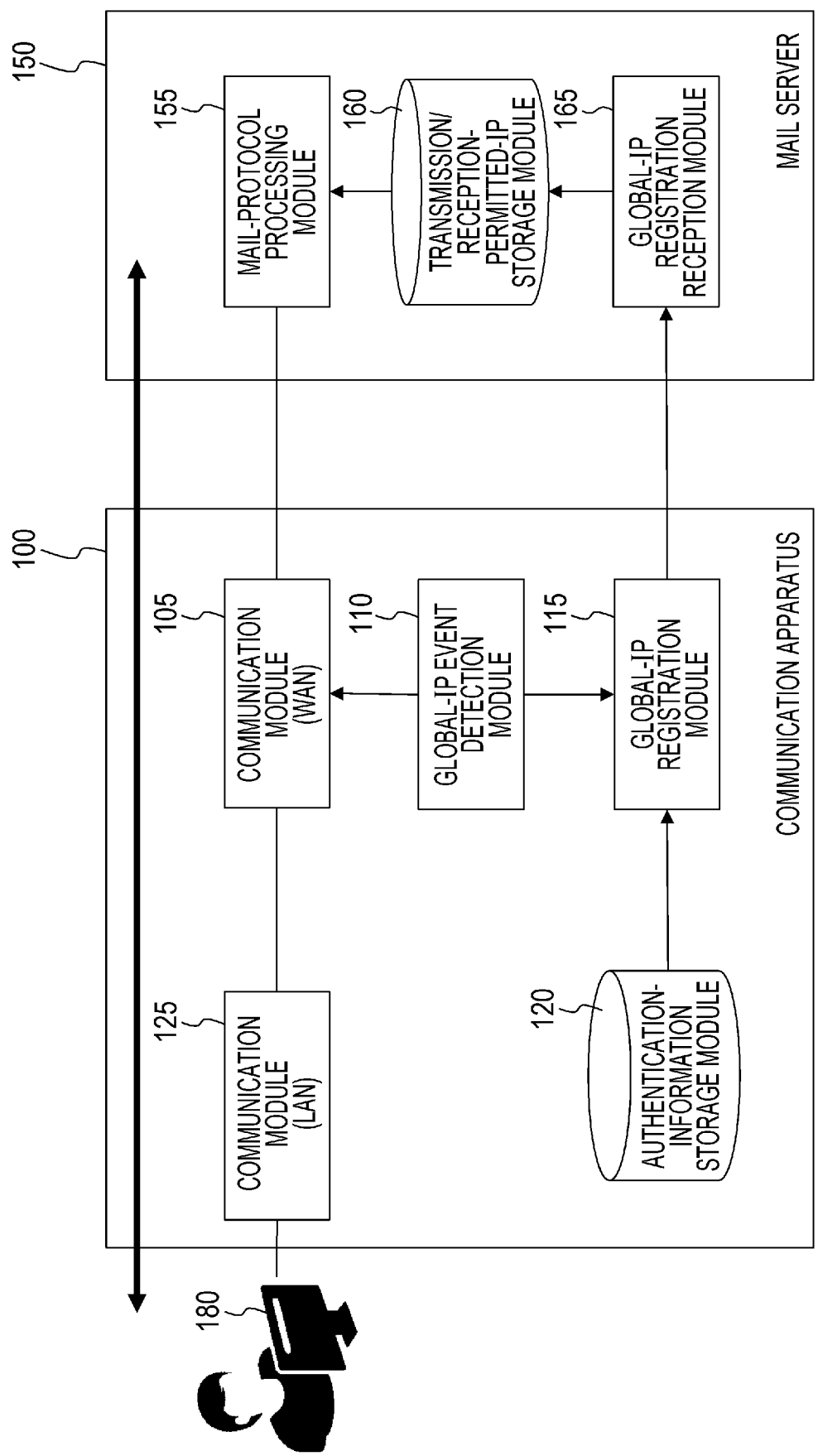
FIG. 1 is a module diagram schematically illustrating a configuration example according to a first exemplary embodiment.

FIG. 1 is a module diagram schematically illustrating a configuration example according to a first exemplary embodiment.

The term "module" generally refers to a logically-separable component, such as software (computer program) or hardware. Therefore, each module in this exemplary embodiment refers not only to a module in a computer program, but also to a module in a hardware configuration. Accordingly, this exemplary embodiment is directed to a description of a computer program for causing a computer to function as each module (i.e., a program for causing the computer to execute each procedure, a program for causing the computer to function as each unit, and a program for causing the computer to implement each function), as well as to a system and a method. Although the expressions "store data", "make a device store data", and expressions equivalent to these expressions are used for the sake of convenience, these expressions have a meaning of making a storage device store data or performing control to make the storage device store data if the exemplary embodiment corresponds to a computer program. The modules may correspond to the respective functions in a one-to-one fashion, but in actual implementation, each module may be constituted of a single program, multiple modules may be constituted of a single program, or each module may be constituted of multiple programs. Furthermore, multiple modules may be implemented by a single computer, or a single module may be implemented by multiple computers in a distributed or parallel environment. Moreover, a single module may include another module. The term "connection" used hereinafter refers not only to a physical connection, but also to a logical connection (i.e., exchanging of data, transmission of a command, a reference relationship between data, or a log-in process). The term "predetermined" refers to a state in which a value is preset before intended processing is to be performed, and includes not only a case where a value is preset prior to commencement of processing according to this exemplary embodiment, but also a case where a value is preset at a time point prior to the intended processing even when the processing according to this exemplary embodiment has already commenced, depending on the current condition or status or the previous condition or status. If there are multiple "predetermined values", the values may be different from each other, or two or more values (including all of the values) may be the same. Furthermore, the expression "in the case of A, B is performed" is used to indicate that "a process for determining A is performed, and if the determination result indicates A, B is performed". However, this excludes a case where it is not necessary to perform the process for determining A. Furthermore, in a case where items are listed, as in "A, B, and C", this is an exemplary list unless otherwise noted, and includes a case where only one of the items (e.g., only A) is selected.

The terms "system" and "apparatus" include not only a configuration in which multiple computers, hardware units, or apparatuses are connected by a communication unit, such as a network (including one-to-one communication connections), but also a configuration achieved by a single computer, a single hardware unit, or a single apparatus. The terms "apparatus" and "system" are used as terms with an equivalent meaning. The term "system" does not include the meaning of a social system, which is a type of a man-made agreement or arrangement.

In a case where processing is to be performed by each module or multiple types of processing are to be performed within a module, target information is read from the storage device for each processing, and the processed result is written into the storage device upon completion of the processing. Therefore, descriptions regarding reading of information from the storage device before the processing and writing of information into the storage device after the processing are sometimes omitted. Examples of the storage device in this case may include a hard disk drive, a random access memory (RAM), an external storage medium, a storage device via a communication line, and a register within a central processing unit (CPU).

A communication apparatus 100 according to the first exemplary embodiment is connected to a communication line by using a dynamically-set global IP address and has a function of making an IP-address-limitation request to a mail server 150. As shown in an example in FIG. 1, the communication apparatus 100 includes a communication module (WAN) 105, a global-IP event detection module 110, a global-IP registration module 115, an authentication-information storage module 120, and a communication module (LAN) 125. In detail, a router or gateway having a network address translation (NAT) function corresponds to the communication apparatus 100.

The communication apparatus 100 is used for preventing the use of electronic mails not intervened by the communication apparatus 100, such as for preventing outside use of electronic mails.

As a specific example, when electronic mails are used in a corporation, there are cases where it is desirable to limit the exchanging of electronic mails with locations outside the corporation, where it is difficult for the corporation to manage and monitor the use of electronic mails. As a function that may be used for such a purpose, there is a method of using a function (also referred to as "IP-address limiting function") of limiting IP addresses of mail clients by using the mail server 150 so as to limit exchanging of electronic mails with addresses other than global IP addresses located in the corporation. However, with regard to this IP-address limiting function, the global IP addresses have to be fixed or have to be located within a fixed range (i.e., within a range preset by the mail server 150). This is problematic in that variable IP addresses or variable IP addresses that may change from the fixed range are not usable. A variable IP address is an IP address temporarily allocated to a user by an Internet service provider (also referred to as "ISP" hereinafter). Normally, of IP addresses owned by an ISP, unused IP addresses are sequentially allocated, so that the IP addresses change every time there is a connection. In particular, with regard to variable IP addresses prepared in an inexpensive ISP, the ISP performs the allocation so that an IP address may possibly become a "variable IP address that may change from the fixed range". In other words, when variable IP addresses are used, it is difficult to prevent outside use of electronic mails by using the IP-address limiting function of the mail server 150. If the aforementioned global IP addresses are set within the fixed range by using the mail server 150, it may be possible to allow global IP addresses to be set over a wide range. However, this attenuates the IP-address limiting function to begin with, thus resulting in a reduced security level.

The communication apparatus 100 according to this exemplary embodiment prevents the use of electronic mails not intervened by the communication apparatus 100, specifically, limits exchanging of electronic mails with locations outside the corporation in the above-described example, even in a situation where static global IP addresses are not usable (i.e., even in a situation where variable IP addresses are used).

The communication module (WAN) 105 is connected to the global-IP event detection module 110 and the communication module (LAN) 125, and to a mail-protocol processing module 155 in the mail server 150. The communication module (WAN) 105 is connected to the communication line by using a dynamically-set global IP address. The communication module (WAN) 105 is at least connected to the mail server 150 by the communication line. The communication line is, for example, a wide area network (WAN), more specifically, the Internet as an infrastructure.

The global-IP event detection module 110 is connected to the communication module (WAN) 105 and the global-IP registration module 115. The global-IP event detection module 110 detects (monitors) a change in a global IP address from a process in the communication module (WAN) 105. A global IP address is changed by, for example, an Internet service provider. Examples of the detection process performed by the global-IP event detection module 110 includes a first method of receiving a notification indicating that there has been a change in a global IP address from the communication module (WAN) 105, a second method of causing an interruption to occur if there is a change in a global IP address, and a third method of storing the global IP address previously used by the communication module (WAN) 105 and detecting that the global IP address is different by comparing it with a global IP address currently used by the communication module (WAN) 105. The third method is normally performed in cycles (e.g., every five minutes) but does not necessarily have to be performed in cycles.

Then, the global-IP event detection module 110 issues a global-IP change event for the global-IP registration module 115.

The global-IP registration module 115 is connected to the global-IP event detection module 110 and the authentication-information storage module 120, and to a global-IP registration reception module 165 in the mail server 150. If the global-IP event detection module 110 detects a change in a global IP address, the global-IP registration module 115 transmits the changed global IP address to the mail server 150 so that the global IP address is registered in the IP-address limiting function of the mail server 150. In detail, the global IP address is registered in the mail server 150 by using a non-mail protocol.

The global IP address to be registered in this case may be a single IP address or may be an IP address that indicates a range. This range may be reduced to avoid a decrease in the security level, and also permits continuous exchanging of electronic mails at the same time even if an allocated IP address of the communication apparatus 100 changes.

The IP-address limiting function of the mail server 150 is a function that limits, for example, Simple Mail Transport Protocol (SMTP), Post Office Protocol (POP), or Internet Message Access Protocol (IMAP) connection in accordance with IP addresses and may be set so as to permit connection with the mail server 150 only from in-house locations (or to not permit connection from the outside). In this case, the term "limit" refers to accepting exchanging of mails with an IP address from a designated domain (i.e., an IP address transmitted from the communication apparatus 100) (or not accepting exchanging of mails with an IP address other than the above IP address).

Figure 3:
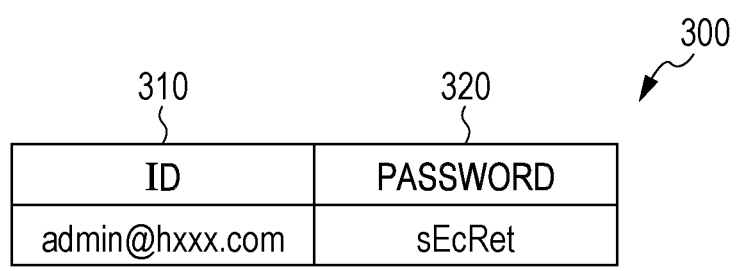
FIG. 3 illustrates an example of a data structure of an authentication-information management table.

The authentication-information storage module 120 is connected to the global-IP registration module 115. The authentication-information storage module 120 stores an authentication-information management table 300 shown in an example in FIG. 3. FIG. 3 illustrates an example of a data structure of the authentication-information management table 300. The authentication-information management table 300 has an ID field 310 and a password field 320. The ID field 310 stores user IDs. The password field 320 stores passwords. For example, a password for a user ID "admin@hxxx.com" is "sEcRet". These are a user ID and a password for accessing (logging into) the IP-address limiting function of a domain "hxxx.com". In a case where the global IP address of the domain "hxxx.com" is changed, the user ID and the password are used for accessing the IP-address limiting function of the mail server 150. The global-IP registration module 115 uses data in a domain/IP-address correspondence management table 400 to access the global-IP registration reception module 165 in the mail server 150.

The communication module (LAN) 125 is connected to the communication module (WAN) 105 and a user terminal 180. The communication module (LAN) 125 is connected to the communication line by using a local IP address. The communication module (LAN) 125 is at least connected to the user terminal 180, with which electronic mails are exchanged, by a communication line. The communication line is, for example, a local area network (LAN), more specifically, an intranet as an infrastructure.

In other words, in order to exchange electronic mails, the user terminal 180 may use the mail server 150 via the communication module (WAN) 105 and the communication module (LAN) 125. In detail, transmission and reception for a user mail address "user1@hxxx.com" (domain "hxxx.com") of the user terminal 180 are performed by using POP3 and SMTP. Needless to say, conversion of the local IP address used in the LAN and the global IP address used in the WAN is performed.

The mail server 150 includes the mail-protocol processing module 155, a transmission/reception-permitted-IP storage module 160, and the global-IP registration reception module 165. The mail server 150 has an electronic-mail exchanging function and is a server computer for delivering electronic mails. The mail server 150 has the aforementioned IP-address limiting function. With regard to limitation of an IP address of a mail client (i.e., the user terminal 180) in the mail server 150, the mail server 150 updates a change in the IP address every time there is a request from the communication apparatus 100 in the location with which mails are exchanged.

The mail-protocol processing module 155 is connected to the transmission/reception-permitted-IP storage module 160 and to the communication module (WAN) 105 in the communication apparatus 100. The mail-protocol processing module 155 has an electronic-mail exchanging function. In detail, the mail-protocol processing module 155 exhibits the electronic-mail exchanging function by using POP3 and SMTP. Moreover, the mail-protocol processing module 155 has the aforementioned IP-address limiting function.

Figure 4:
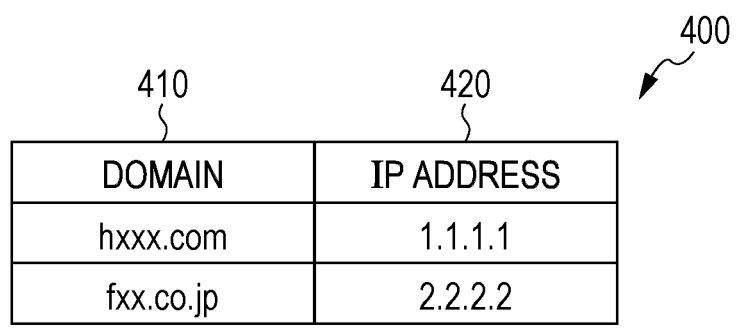
FIG. 4 illustrates an example of a data structure of a domain/IP-address correspondence management table.

The transmission/reception-permitted-IP storage module 160 is connected to the mail-protocol processing module 155 and the global-IP registration reception module 165. The transmission/reception-permitted-IP storage module 160 stores the domain/IP-address correspondence management table 400 shown in an example in FIG. 4. FIG. 4 illustrates an example of a data structure of the domain/IP-address correspondence management table 400. The domain/IP-address correspondence management table 400 has a domain field 410 and an IP-address field 420. The domain field 410 stores domains. The IP-address field 420 stores IP addresses. For example, an IP address for a domain "hxxx.com" is "1.1.1.1", and an IP address for a domain "fxx.co.jp" is "2.2.2.2". By using this domain/IP-address correspondence management table 400, the mail-protocol processing module 155 exhibits the IP-address limiting function. In other words, if there is exchanging of electronic mails with devices having the IP addresses "1.1.1.1" and "2.2.2.2", the exchanging of electronic mails is performed. In contrast, if there is exchanging of electronic mails with devices having other IP addresses, the exchanging of electronic mails is not performed (i.e., not accepted). For example, if there is exchanging of an electronic mail with a device having the domain "hxxx.com", it is confirmed whether the IP address is "1.1.1.1". If the IP address is "1.1.1.1", the exchanging of the electronic mail is performed. If the IP address is different from "1.1.1.1", the electronic mail is not processed. Likewise, if there is exchanging of an electronic mail with a device having the domain "fxx.co.jp", it is confirmed whether the IP address is "2.2.2.2". If the IP address is "2.2.2.2", the exchanging of the electronic mail is performed. If the IP address is different from "2.2.2.2", the electronic mail is not processed.

The global-IP registration reception module 165 is connected to the transmission/reception-permitted-IP storage module 160 and to the global-IP registration module 115 in the communication apparatus 100. If an IP address is received from the communication apparatus 100, the global-IP registration reception module 165 registers the IP address serving as the transmission source of the reception in the IP-address limiting function. In detail, the transmission/reception-permitted-IP storage module 160 is caused to store the IP address. By storing the IP address in the transmission/reception-permitted-IP storage module 160, the mail-protocol processing module 155 only accepts exchanging of electronic mails with that IP address.

The user terminal 180 is connected to the communication module (LAN) 125 in the communication apparatus 100. The user terminal 180 is connected to the LAN and at least has a mailer function (i.e., an electronic-mail exchanging function). For example, the user terminal 180 corresponds to a personal computer or a portable terminal.

Figure 2:
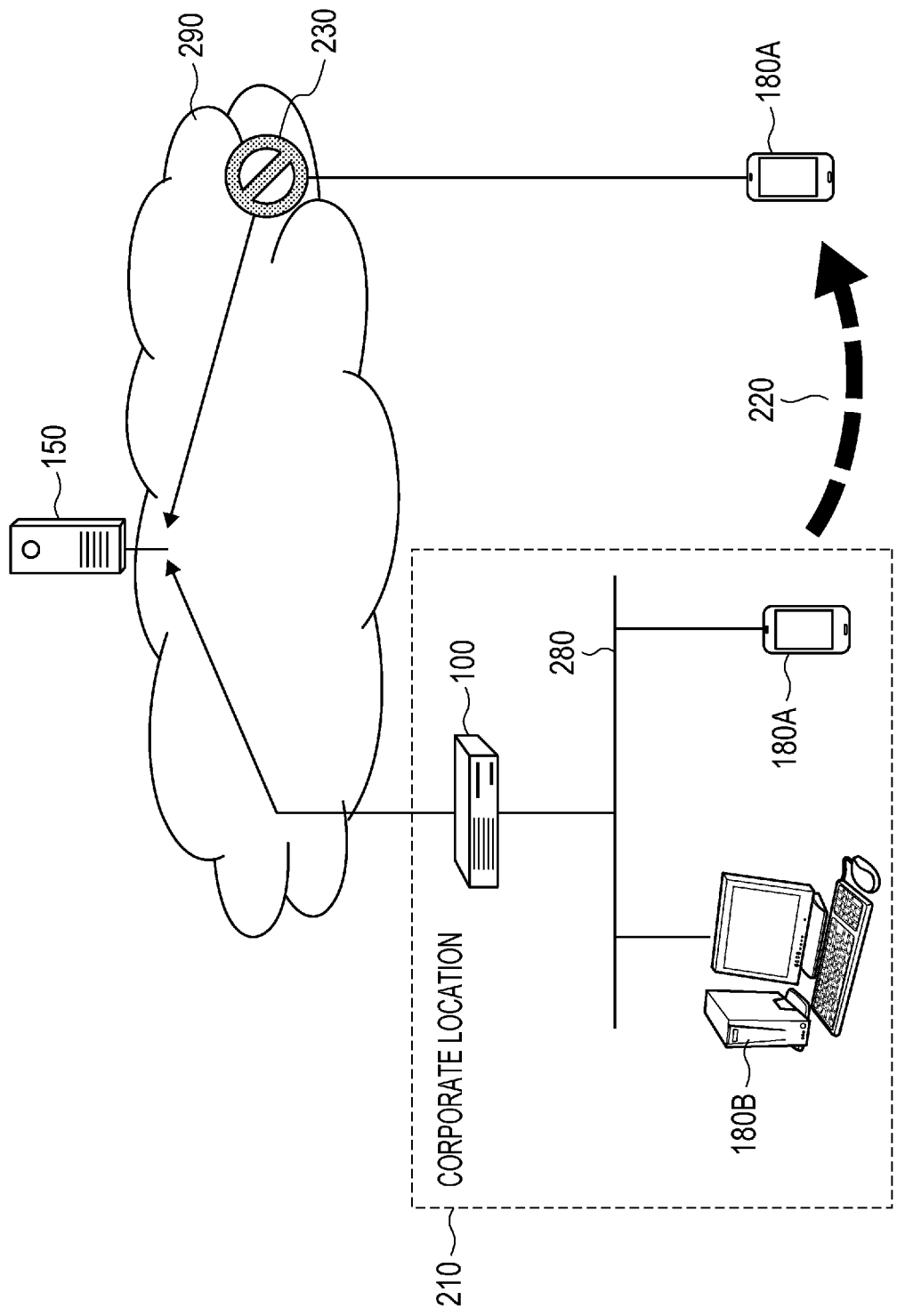
FIG. 2 illustrates a configuration example of a system that employs the first exemplary embodiment.

FIG. 2 illustrates a configuration example of a system that employs this exemplary embodiment.

A corporate location 210 includes the communication apparatus 100, a user terminal 180A, and a user terminal 180B that are connected to a communication line 280. The user terminal 180A is a portable terminal that may be carried outside the corporate location 210 by a user. For example, the user terminals 180 may perform exchanging of electronic mails by using the mail server 150 via the communication apparatus 100.

The communication apparatus 100, the mail server 150, and the user terminal 180A carried outside (denoted by reference sign 220) the corporate location 210 are communicable with one another via a communication line 290. For a corporation, it is desired that the use of the mail server 150 from locations other than the corporate location 210 be limited. Thus, the IP-address limiting function of the mail server 150 is used. The communication apparatus 100 uses a dynamically-set global IP address (variable IP address).

If the corporate location 210 is to be connected to the communication line 290 serving as the Internet, private IP addresses are often used inside the corporation, and global IP addresses are often used only in the Internet-connected sections. By registering the global IP address of the communication apparatus 100 (e.g., gateway apparatus) within the corporate location 210 as a permitted IP address in the mail exchanging function of the mail server 150, the exchanging of mails from outside the corporate location 210 is limited. In detail, although the user terminal 180A and the user terminal 180B connected to the mail server 150 with the communication apparatus 100 interposed therebetween are capable of using the electronic-mail exchanging function of the mail server 150, the user terminal 180A carried outside (220) the corporate location 210 is prohibited (denoted by reference sign 230) from using the mail server 150.

Therefore, the communication apparatus 100 uses corporate authentication information (e.g., the authentication-information management table 300) to register its own global IP address as a mail-transmission/reception-permitted IP address in the mail server 150. This registration process may be performed every time the global IP address of the communication apparatus 100 is changed.

Figure 5:
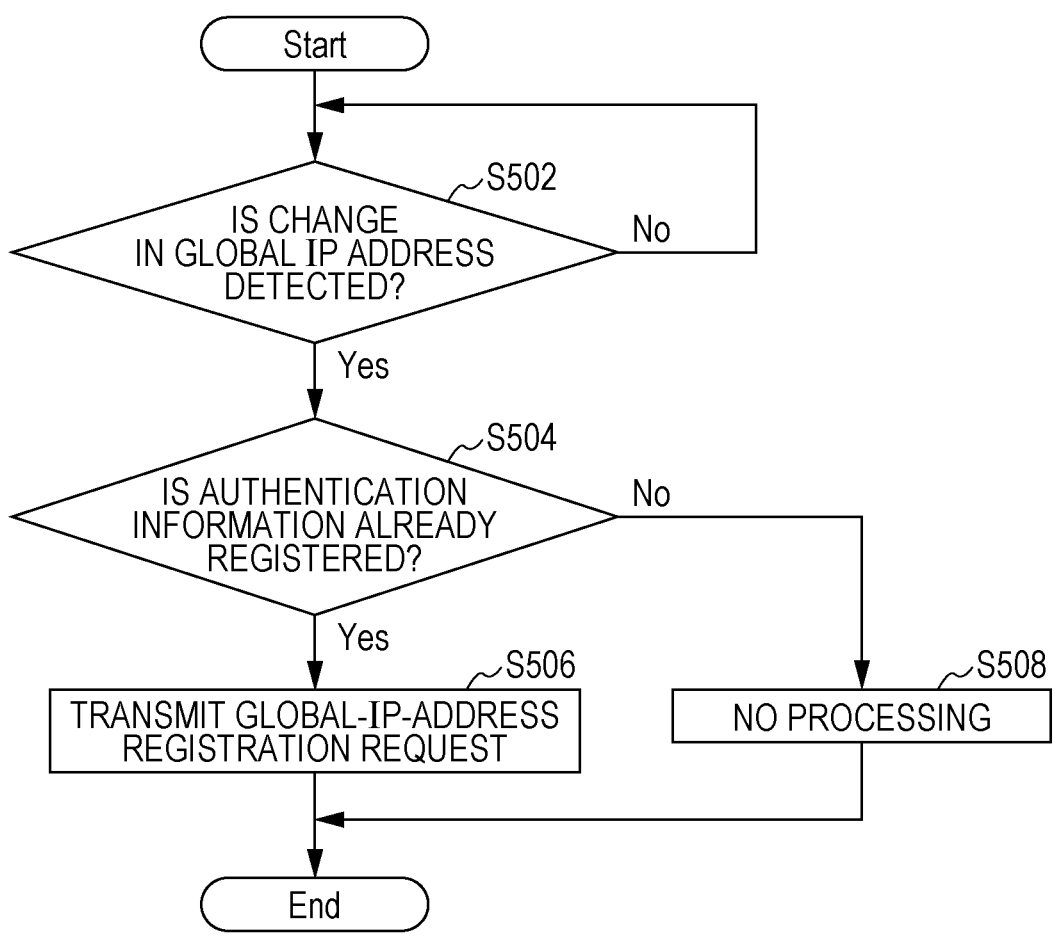
FIG. 5 is a flowchart illustrating an example of a process according to the first exemplary embodiment.

FIG. 5 is a flowchart illustrating an example of a process according to the first exemplary embodiment. In detail, this example relates to a setting process performed on the mail server 150 in accordance with a change in an allocated IP address of a Point-to-Point Protocol over Ethernet (PPPoE) as an event. When performing the IP address-change setting process on the mail server 150, authentication information linked with the corporation is used.

In step S502, the global-IP event detection module 110 determines whether or not a change in a global IP address is detected. If a change is detected, the process proceeds to step S504. Otherwise, the global-IP event detection module 110 waits until a change is detected.

In step S504, the global-IP registration module 115 determines whether or not authentication information is already registered in the authentication-information storage module 120. If authentication information is already registered, the process proceeds to step S506. Otherwise, the process proceeds to step S508.

In step S506, the global-IP registration module 115 transmits a global-IP-address registration request to the mail server 150.

In step S508, the global-IP registration module 115 does not perform any processing.

Figure 6:
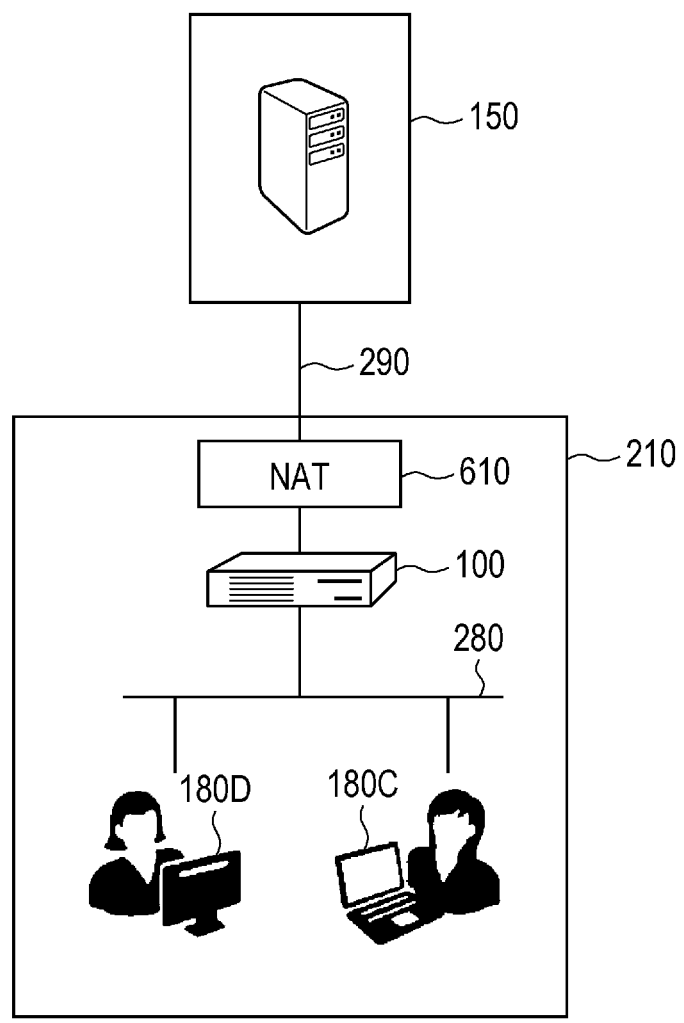
FIG. 6 illustrates an example of a process according to the first exemplary embodiment.

FIG. 6 illustrates an example of a process according to the first exemplary embodiment.

The mail server 150 is connected to a network address translator (NAT) 610, serving as a router, by the communication line 290.

The corporate location 210 has the NAT 610, the communication apparatus 100, a user terminal 180C, and a user terminal 180D.

The NAT 610 is connected to the communication apparatus 100, and is also connected to the mail server 150 by the communication line 290. The NAT 610 has a NAT function.

The communication apparatus 100 is connected to the NAT 610, and is also connected to the user terminal 180C and the user terminal 180D by the communication line 280.

The user terminals 180 (i.e., the user terminal 180C and the user terminal 180D) are connected to the communication apparatus 100 by the communication line 280.

The communication apparatus 100 determines whether or not it is connected to the mail server 150 (i.e., the communication line 290) by the NAT 610. If the communication apparatus 100 is connected to the mail server 150 by the NAT 610, the communication apparatus 100 does not register a global IP address in the mail server 150. In other words, since the global IP address at the WAN side of the NAT 610 is unknown when the communication apparatus 100 as a gateway apparatus is serving under the NAT 610, the communication apparatus 100 does not perform a registration process.

Needless to say, if the communication apparatus 100 is connected to the mail server 150 without the intervention of the NAT 610, the communication apparatus 100 registers a global IP address in the mail server 150, as shown in the example in FIG. 5.

Figure 7:
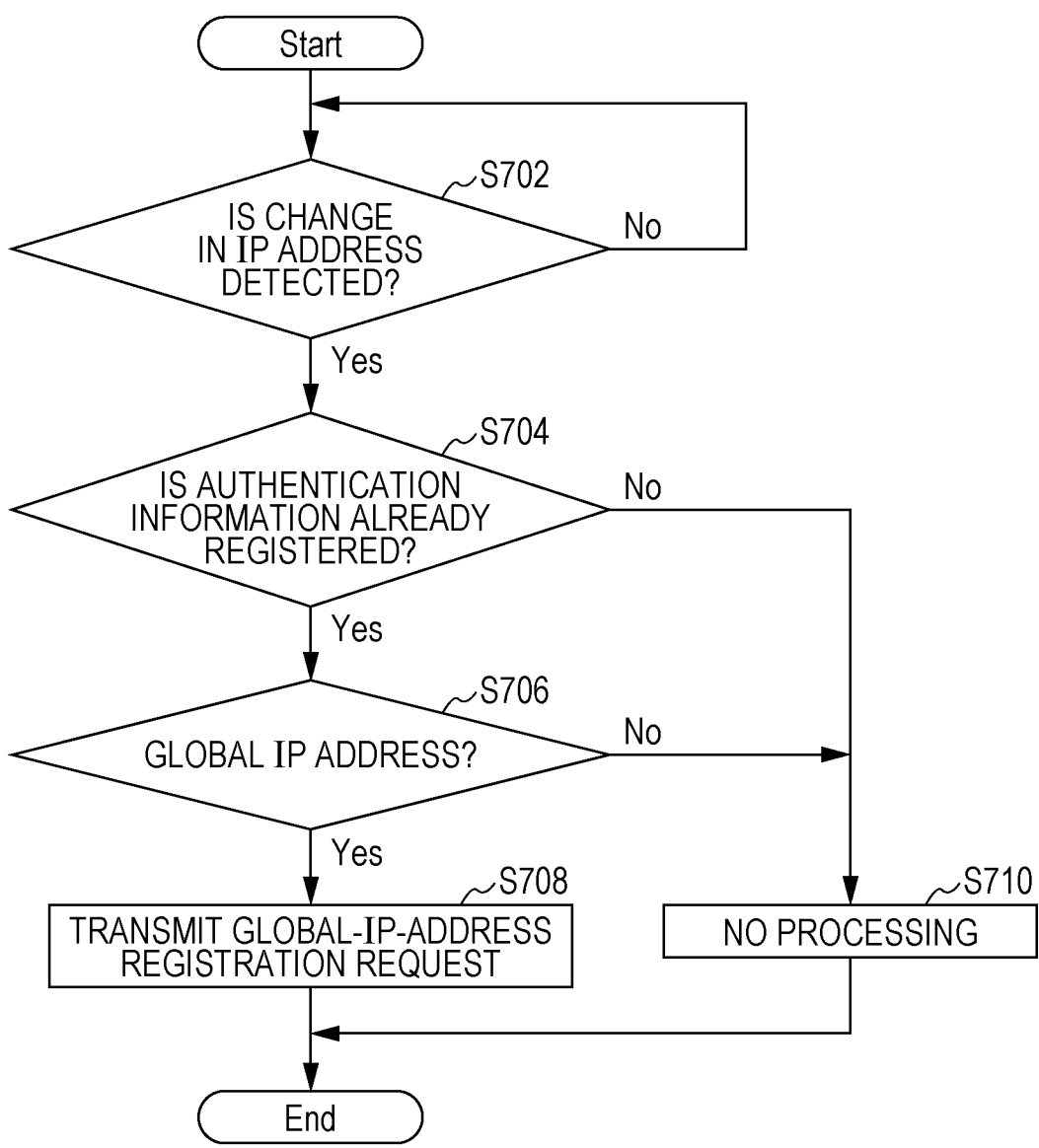
FIG. 7 is a flowchart illustrating an example of a process according to the first exemplary embodiment.

FIG. 7 is a flowchart illustrating an example of a process performed by the communication apparatus 100 according to the first exemplary embodiment. This process corresponds to the configuration shown in the example in FIG. 6. In detail, this example relates to a setting process performed on the mail server 150 in accordance with a change in an allocated IP address of a PPPoE as an event. When performing the IP address-change setting process on the mail server 150, authentication information linked with the corporation is used.

In step S702, the global-IP event detection module 110 determines whether or not a change in an IP address is detected. If a change is detected, the process proceeds to step S704. Otherwise, the global-IP event detection module 110 waits until a change is detected.

In step S704, the global-IP registration module 115 determines whether or not authentication information is already registered in the authentication-information storage module 120. If authentication information is already registered, the process proceeds to step S706. Otherwise, the process proceeds to step S710.

In step S706, the global-IP registration module 115 determines whether or not the changed IP address is a global IP address. If the changed IP address is a global IP address (i.e., if there is no NAT 610), the process proceeds to step S708. Otherwise (i.e., if the communication apparatus 100 is serving under the NAT 610), the process proceeds to step S710.

In step S708, the global-IP registration module 115 transmits a global-IP-address registration request to the mail server 150.

In step S710, the global-IP registration module 115 does not perform any processing. In other words, since the global IP address at the WAN side of the NAT 610 is unknown when the communication apparatus 100 is serving under the NAT 610, the communication apparatus 100 does not perform a registration process.

Figure 8:
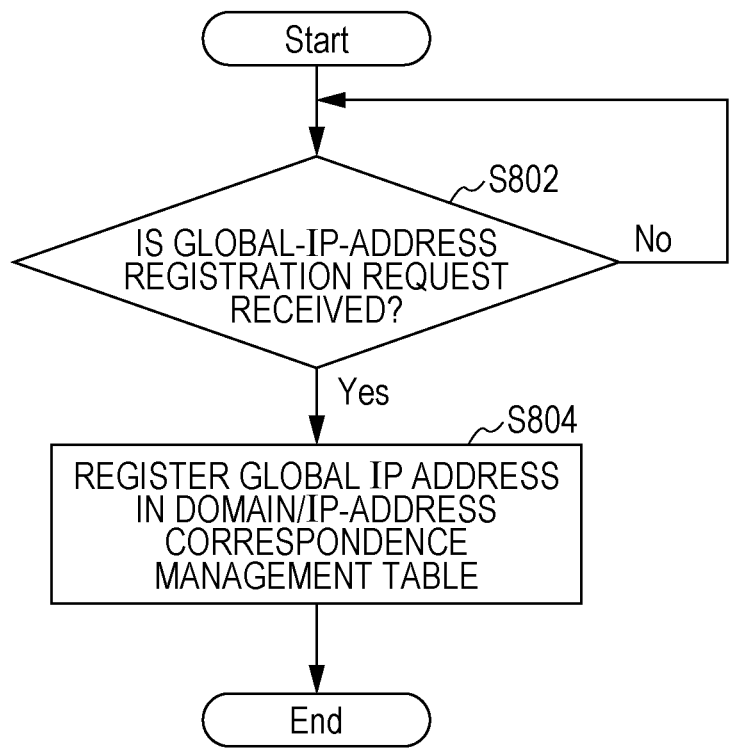
FIG. 8 is a flowchart illustrating an example of a process according to the first exemplary embodiment.

FIG. 8 is a flowchart illustrating an example of a process performed by the mail server 150 according to the first exemplary embodiment.

In step S802, the global-IP registration reception module 165 determines whether or not a global-IP-address registration request (i.e., the use of the IP-address limiting function) is received. If a global-IP-address registration request is received, the process proceeds to step S804. Otherwise, the global-IP registration reception module 165 waits until a global-IP-address registration request is received.

In step S804, the global-IP registration reception module 165 registers the global IP address in the domain/IP-address correspondence management table 400 within the transmission/reception-permitted-IP storage module 160. Consequently, exchanging of electronic mails with the device having that global IP address is accepted hereinafter.

Second Exemplary Embodiment

Figure 9:
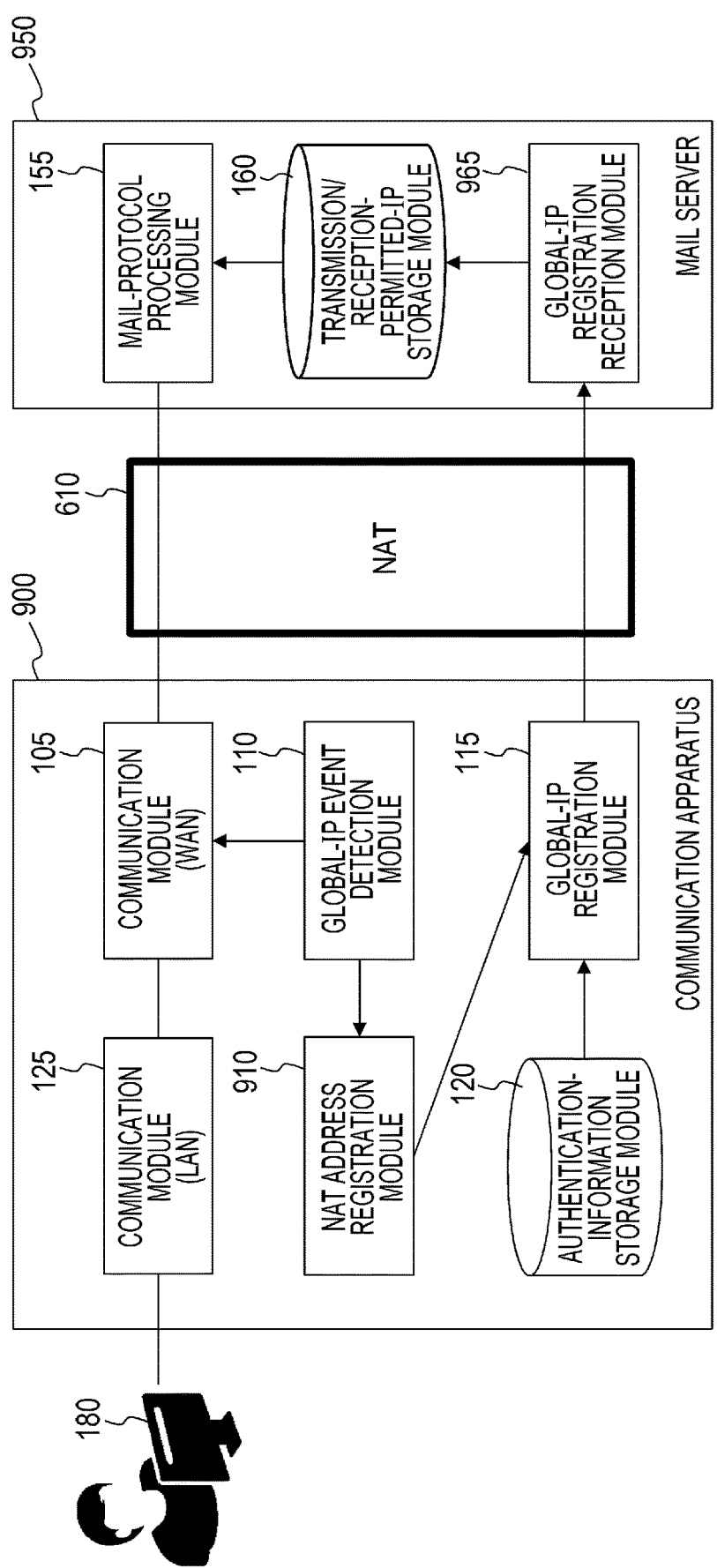
FIG. 9 is a module diagram schematically illustrating a configuration example according to a second exemplary embodiment.

FIG. 9 is a module diagram schematically illustrating a configuration example according to a second exemplary embodiment.

A communication apparatus 900 includes a communication module (WAN) 105, a global-IP event detection module 110, a global-IP registration module 115, an authentication-information storage module 120, a communication module (LAN) 125, and a NAT address registration module 910. The communication apparatus 900 is connected to a communication line by a NAT 610 (router) having a network address translation (NAT) function by using a dynamically-set global IP address.

Sections identical or similar to those in the above exemplary embodiment are given the same reference signs, and redundant descriptions thereof will be omitted (the same applies hereinafter).

Although the communication apparatus 100 and the mail server 150 are directly connected to each other by a WAN in the first exemplary embodiment, the communication apparatus 900 and a mail server 950 are intervened by the NAT 610 in the second exemplary embodiment. The configuration is similar to that shown in the example in FIG. 6. In this case, the communication apparatus 900 similarly registers a changed global IP address in the mail server 950.

The communication module (WAN) 105 is connected to the global-IP event detection module 110 and the communication module (LAN) 125, and is also connected to the mail-protocol processing module 155 in the mail server 950 by the NAT 610.

The global-IP event detection module 110 is connected to the communication module (WAN) 105 and the NAT address registration module 910.

The global-IP registration module 115 is connected to the authentication-information storage module 120 and the NAT address registration module 910, and is also connected to a global-IP registration reception module 965 in the mail server 950 by the NAT 610. The global-IP registration module 115 transmits a predetermined IP address to the mail server 950 (i.e., the global-IP registration reception module 965) in accordance with a command from the NAT address registration module 910. Needless to say, in order to access the mail server 950, data in the domain/IP-address correspondence management table 400 within the authentication-information storage module 120 is used.

The authentication-information storage module 120 is connected to the global-IP registration module 115.

The communication module (LAN) 125 is connected to the communication module (WAN) 105 and the user terminal 180.

The user terminal 180 is connected to the communication module (LAN) 125 in the communication apparatus 900.

The NAT address registration module 910 is connected to the global-IP event detection module 110 and the global-IP registration module 115. In order to register a global IP address in the IP-address limiting function of the mail server 950, the NAT address registration module 910 transmits a predetermined IP address at predetermined intervals to the mail server 950 via the global-IP registration module 115. The predetermined intervals may be, for example, every five minutes.

The predetermined IP address used may be an IP address not used as an actual IP address. For example, an IP address "0.0.0.0" may be used. In detail, for example, the NAT address registration module 910 gives a command for registering the IP address "0.0.0.0" in the mail server 950 every five minutes.

The mail server 950 includes the mail-protocol processing module 155, the transmission/reception-permitted-IP storage module 160, and the global-IP registration reception module 965.

The mail-protocol processing module 155 is connected to the transmission/reception-permitted-IP storage module 160, and is also connected to the communication module (WAN) 105 in the communication apparatus 900 by the NAT 610.

The transmission/reception-permitted-IP storage module 160 is connected to the mail-protocol processing module 155 and the global-IP registration reception module 965. The transmission/reception-permitted-IP storage module 160 stores the domain/IP-address correspondence management table 400 shown in the example in FIG. 4.

The global-IP registration reception module 965 is connected to the transmission/reception-permitted-IP storage module 160, and is also connected to the global-IP registration module 115 in the communication apparatus 900 by the NAT 610. If a predetermined IP address is received from the communication apparatus 900, the global-IP registration reception module 965 registers the IP address serving as the transmission source of the reception in the IP-address limiting function. In detail, if the global IP address is "0.0.0.0", the global-IP registration reception module 965 sets the transmission-source IP address of the communication as a permitted IP address. This transmission-source IP address is a global IP address changed by the NAT 610 since it is transmitted through the NAT 610.

Figure 10:
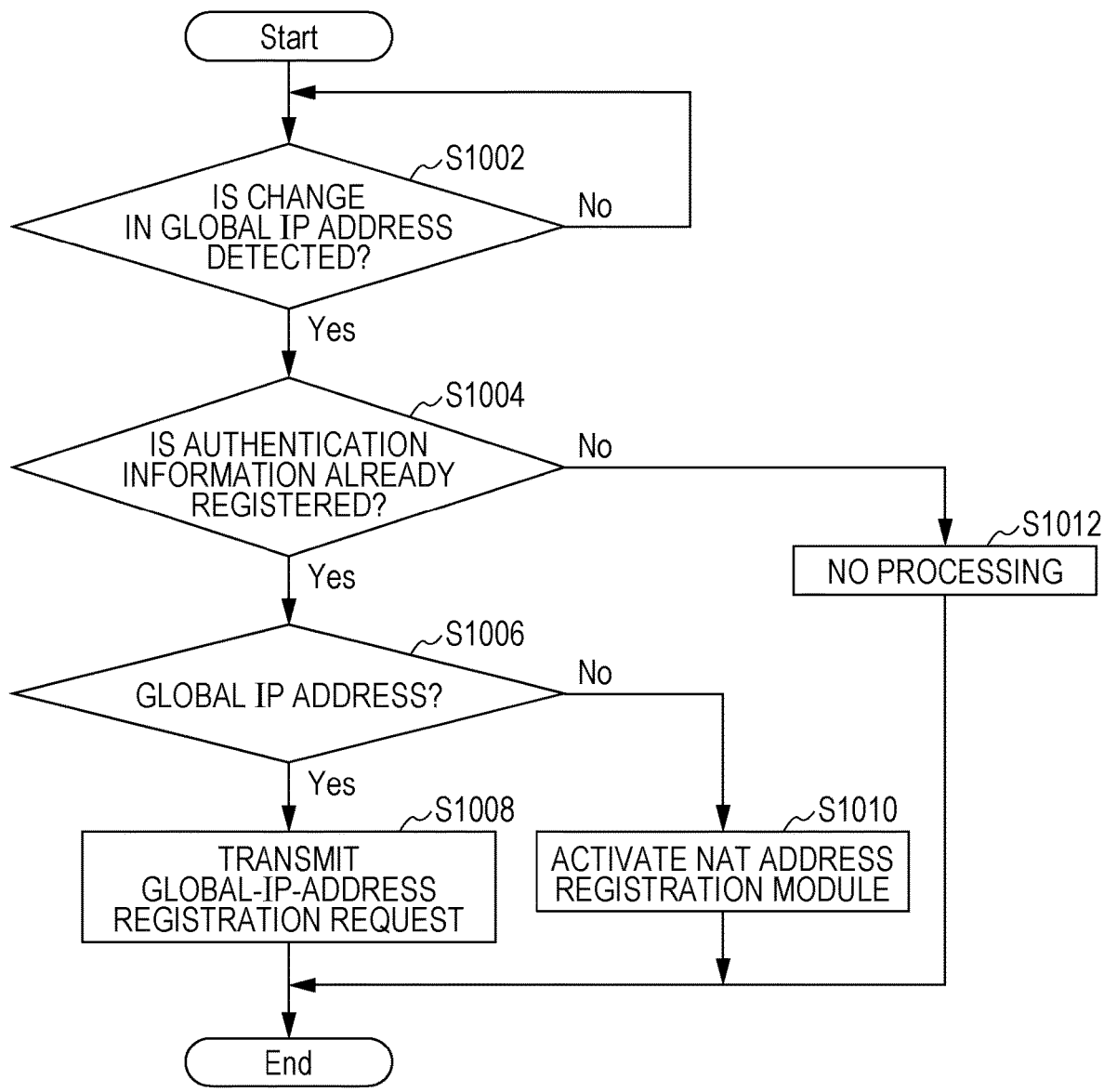
FIG. 10 is a flowchart illustrating an example of a process according to the second exemplary embodiment.

FIG. 10 is a flowchart illustrating an example of a process performed by the communication apparatus 900 according to the second exemplary embodiment. In detail, this example relates to a setting process performed on the mail server 950 in accordance with a change in an allocated IP address of a PPPoE as an event. When performing the IP address-change setting process on the mail server 950, authentication information linked with the corporation is used.

In step S1002, the global-IP event detection module 110 determines whether or not a change in an IP address is detected. If a change is detected, the process proceeds to step S1004. Otherwise, the global-IP event detection module 110 waits until a change is detected.

In step S1004, the global-IP registration module 115 determines whether or not authentication information is already registered in the authentication-information storage module 120. If authentication information is already registered, the process proceeds to step S1006. Otherwise, the process proceeds to step S1012.

In step S1006, the global-IP event detection module 110 determines whether or not the changed IP address is a global IP address. If the changed IP address is a global IP address, the process proceeds to step S1008. Otherwise, the process proceeds to step S1010.

In step S1008, the global-IP registration module 115 transmits a global-IP-address registration request.

In step S1010, the NAT address registration module 910 is activated. A detailed process example will be described later with reference to an example in FIG. 11.

In step S1012, the global-IP registration module 115 does not perform any processing.

Figure 11:
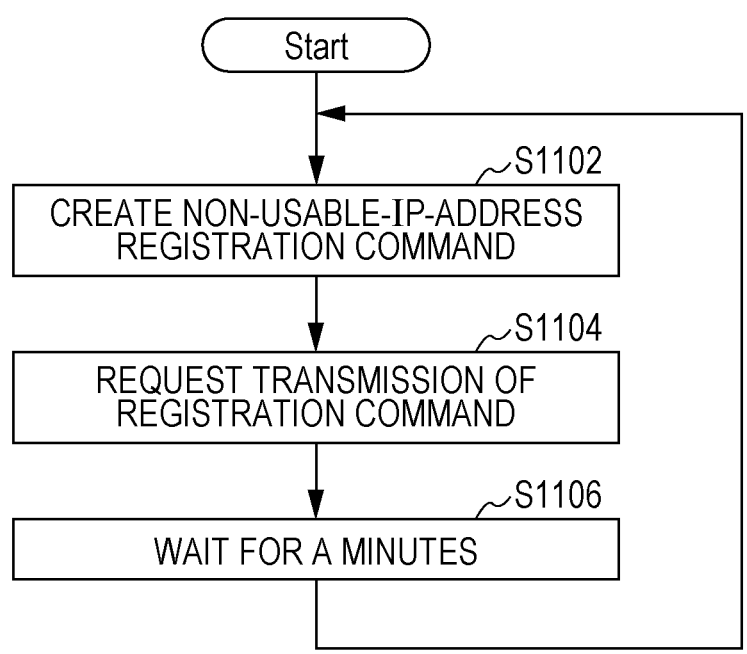
FIG. 11 is a flowchart illustrating an example of a process according to the second exemplary embodiment.

FIG. 11 is a flowchart illustrating an example of a process performed by the NAT address registration module 910 according to the second exemplary embodiment.

In step S1102, a non-usable-IP-address registration command is created. For example, a registration command for "0.0.0.0" is created.

In step S1104, the global-IP registration module 115 is requested to transmit the registration command. The global-IP registration module 115 uses the domain/IP-address correspondence management table 400 to log into the communication apparatus 900, and transmits the non-usable-IP-address registration command.

In step S1106, the process waits for A minutes and returns to step S1102. In other words, this process is periodically performed.

Figure 12:
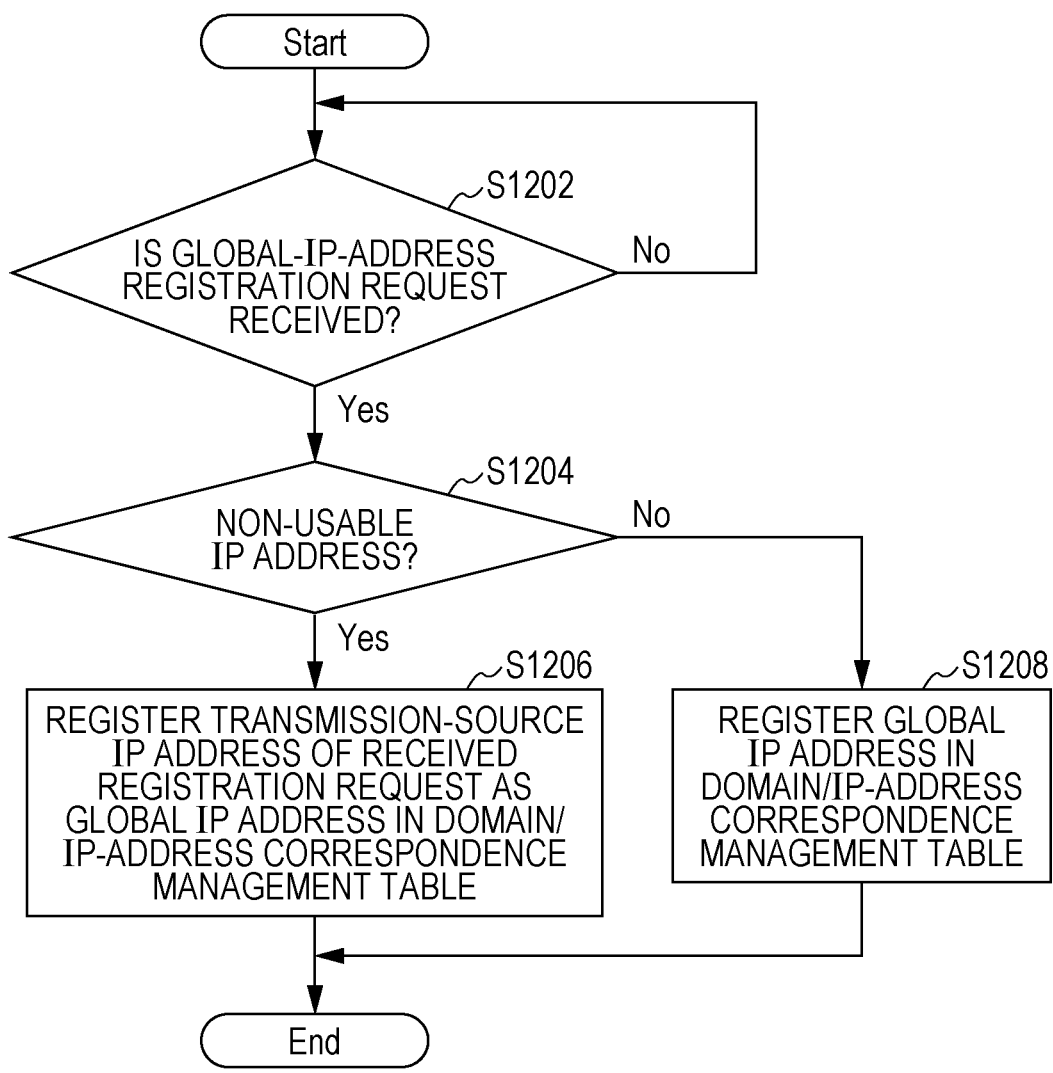
FIG. 12 is a flowchart illustrating an example of a process according to the second exemplary embodiment.

FIG. 12 is a flowchart illustrating an example of a process performed by the mail server 950 according to the second exemplary embodiment.

In step S1202, the global-IP registration reception module 965 determines whether or not a global-IP-address registration request (i.e., the use of the IP-address limiting function) is received. If a global-IP-address registration request is received, the process proceeds to step S1204. Otherwise, the global-IP registration reception module 965 waits until a global-IP-address registration request is received.

In step S1204, the global-IP registration reception module 965 determines whether or not the global IP address is a non-usable IP address. If the global IP address is a non-usable IP address, the process proceeds to step S1206. Otherwise, the process proceeds to step S1208. For example, if the global IP address corresponding to the registration request is "0.0.0.0", the process proceeds to step S1206 where the IP address serving as the transmission source of the communication is set as a permitted IP address.

In step S1206, the global-IP registration reception module 965 registers the transmission-source IP address corresponding to the received registration request as a global IP address in the domain/IP-address correspondence management table 400. In this case, the global IP address is registered by the NAT 610.

In step S1208, the global-IP registration reception module 965 registers a global IP address in the domain/IP-address correspondence management table 400. A process similar to that in the first exemplary embodiment is performed.

Third Exemplary Embodiment

Figure 13:
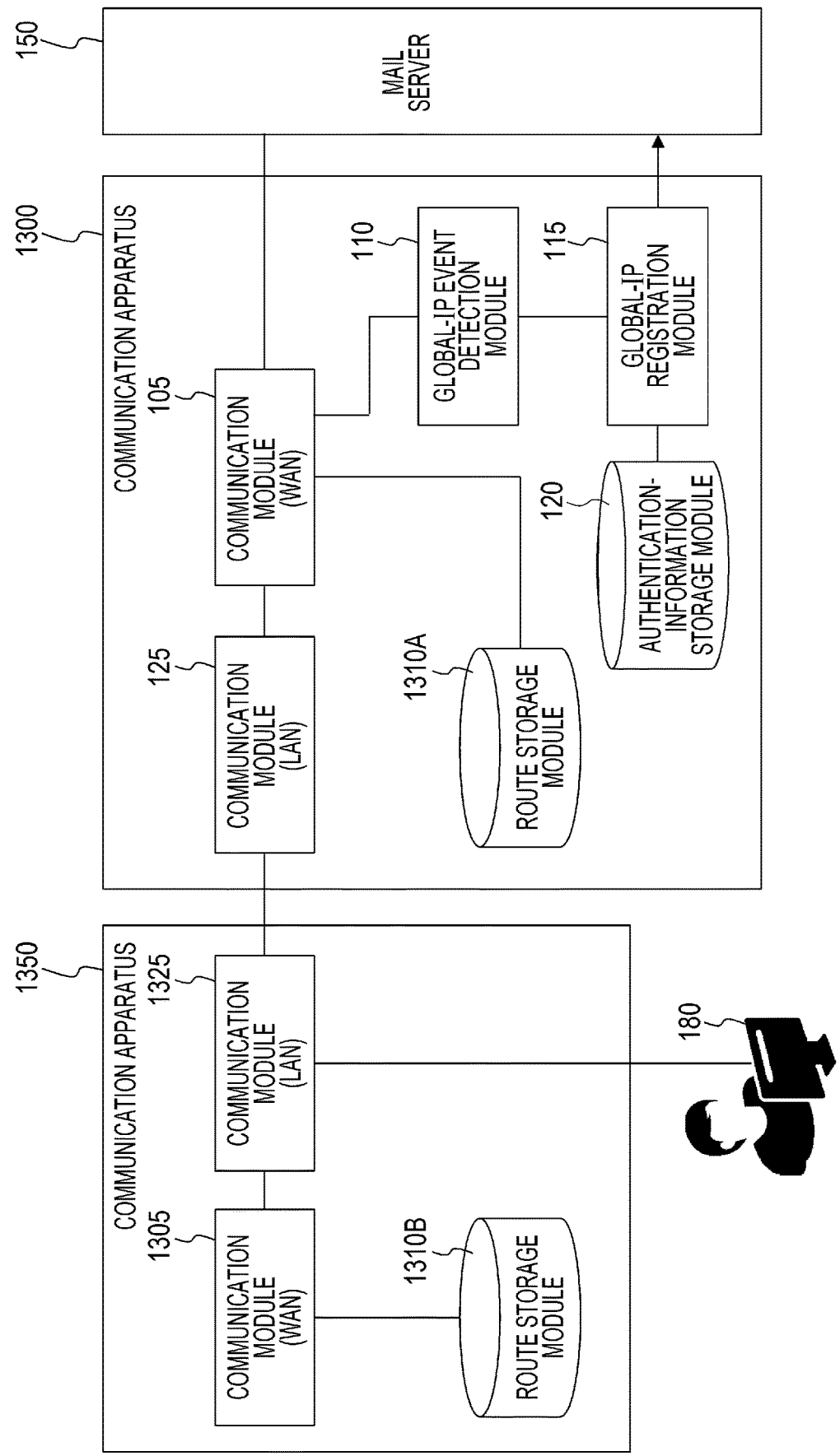
FIG. 13 is a module diagram schematically illustrating a configuration example according to a third exemplary embodiment.

FIG. 13 is a module diagram schematically illustrating a configuration example according to a third exemplary embodiment.

A communication apparatus 1350 is similar to a communication apparatus 1300 in that it is connectable to a WAN.

However, in a case where the user terminal 180 connected to the communication apparatus 1350 is to perform exchanging of electronic mails, the communication apparatus 1350 communicates with the mail server 150 via the communication apparatus 1300. In a case where communication with a WAN-side apparatus (such as an apparatus other than the mail server 150) is to be performed besides exchanging of electronic mails, communication is performed by directly using the WAN without the intervention of the communication apparatus 1300.

The communication apparatus 1300 includes a communication module (WAN) 105, a global-IP event detection module 110, a global-IP registration module 115, an authentication-information storage module 120, a communication module (LAN) 125, and a route storage module 1310A.

The communication module (WAN) 105 is connected to the global-IP event detection module 110, the communication module (LAN) 125, and the route storage module 1310A, and to the mail-protocol processing module 155 in the mail server 150. The communication module (WAN) 105 transmits data related to exchanging of an electronic mail received from the communication apparatus 1350 to the mail server 150 in accordance with a route within the route storage module 1310A. On the other hand, data related to exchanging of an electronic mail received by the mail server 150 is transmitted to the communication apparatus 1350 (i.e., the user terminal 180 connected to the communication apparatus 1350) in accordance with the route within the route storage module 1310A.

The global-IP event detection module 110 is connected to the communication module (WAN) 105 and the global-IP registration module 115.

The global-IP registration module 115 is connected to the global-IP event detection module 110 and the authentication-information storage module 120, and to the global-IP registration reception module 165 in the mail server 150.

The authentication-information storage module 120 is connected to the global-IP registration module 115.

The route storage module 1310A is connected to the communication module (WAN) 105. The route storage module 1310A stores a route that extends through the communication apparatus 1350 and that is to be used when performing communication with the mail server 150. This route is stored by using a route advertising function.

The communication module (LAN) 125 is connected to the communication module (WAN) 105 and to a communication module (LAN) 1325 in the communication apparatus 1350. The communication module (LAN) 125 is connected to the communication apparatus 1350 by a virtual private network (VPN). The VPN includes an intranet.

The communication apparatus 1350 includes a communication module (WAN) 1305, a route storage module 1310B, and a communication module (LAN) 1325.

The communication module (WAN) 1305 is connected to the communication module (LAN) 1325 and the route storage module 1310B. The communication module (WAN) 1305 is connected to a communication line (i.e., the WAN to which the communication apparatus 1300 is connected) by using a dynamically-set global IP address.

The route storage module 1310B is connected to the communication module (WAN) 1305. The route storage module 1310B stores a route that extends through the communication apparatus 1350 and a VPN 1480 and that is to be used when performing communication with the mail server 150. This route is stored by using a route advertising function.

The communication module (LAN) 1325 is connected to the communication module (WAN) 1305 and to the communication module (LAN) 125 in the communication apparatus 1300. The communication module (LAN) 1325 is connected to the communication apparatus 1300 by a VPN. Exchanging of electronic mails between the user terminal 180 and the mail server 150 is performed via the communication apparatus 1300 by using the VPN. Therefore, the communication module (LAN) 125 and the communication module (LAN) 1325 may use a route advertising function so as to perform exchanging of electronic mails between the user terminal 180, serving as a mail client, and the mail server 150 via the communication apparatus 1300.

Figure 14:
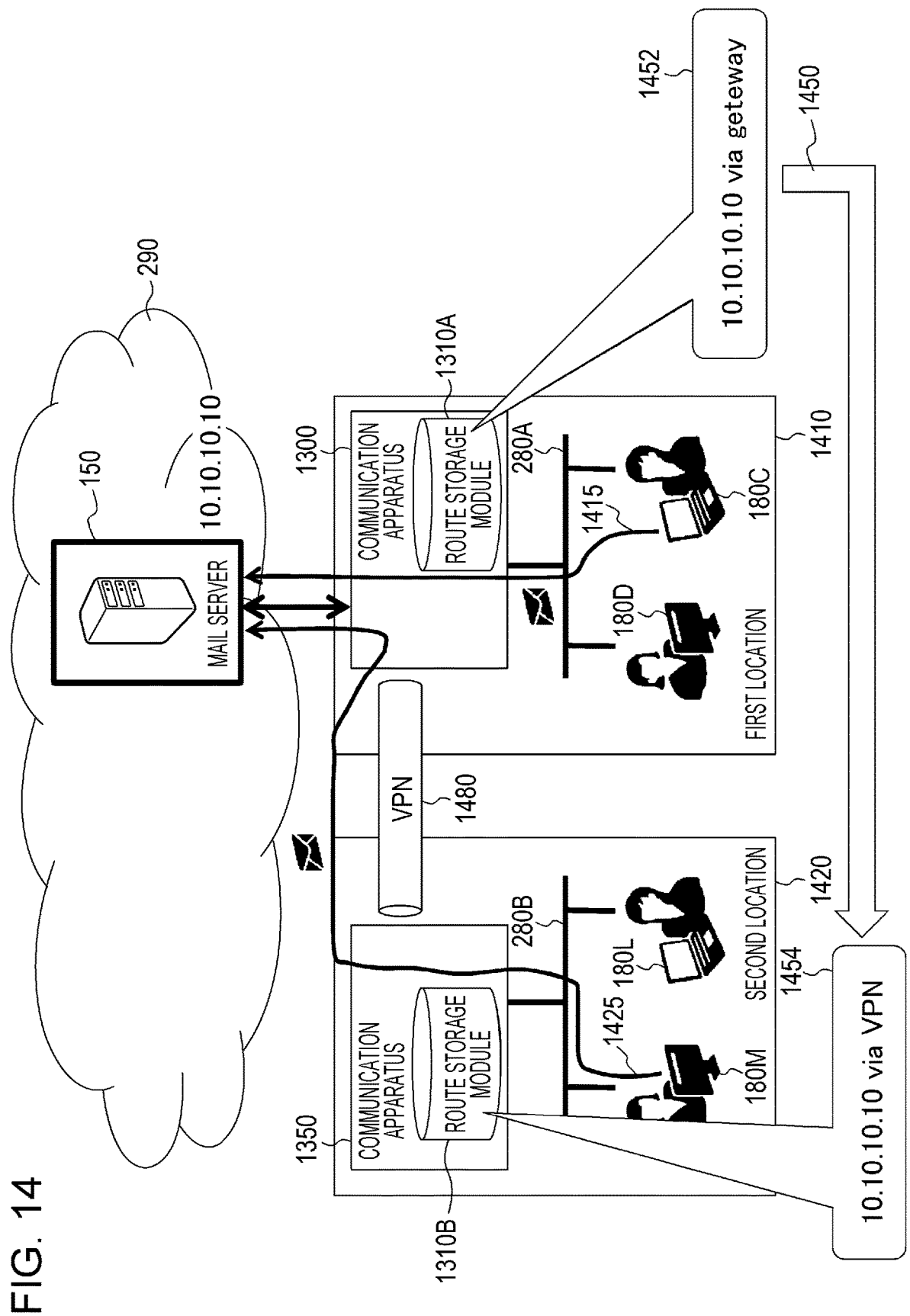
FIG. 14 illustrates an example of a process according to the third exemplary embodiment.

FIG. 14 illustrates an example of a process according to the third exemplary embodiment.

In a multi-location configuration based on the VPN 1480, a route advertising function (i.e., a known technology) may be used. For example, routing information is transmitted by using Border Gateway Protocol (BGP), so that a static route to the mail server 150 is set.

A mail client (user terminal 180) at each location and the mail server 150 communicate with each other via the communication apparatus 1300 (i.e., a freely-chosen location). Thus, the mail transmission/reception history may be compiled in the communication apparatus 1300.

For each one (i.e., the corporation in the above example) capable of accessing the mail server 150, only a single communication apparatus 1300 communicates with the mail server 150. Only the communication apparatus 1300 may use the IP-address limiting function in the mail server 150.

In a first location 1410, the communication apparatus 1300 and the user terminals 180C and 180D that may serve as mail clients are disposed.

The communication apparatus 1300 includes the route storage module 1310A.

In a second location 1420, the communication apparatus 1350 and user terminals 180L and 180M that may serve as mail clients are disposed.

The communication apparatus 1350 includes the route storage module 1310B.

The mail server 150 is connected to the communication apparatus 1300 and the communication apparatus 1350 in a communicable manner by the communication line 290.

The communication apparatus 1300 is connected to the mail server 150 by the communication line 290, is connected to the user terminal 180C and the user terminal 180D by a communication line 280A, and is connected to the communication apparatus 1350 in the second location 1420 by the VPN 1480.

The user terminal 180C and the user terminal 180D are connected to the communication apparatus 1300 by the communication line 280A.

The communication apparatus 1350 is connected to the user terminal 180M and the user terminal 180L by a communication line 280B, and is also connected to the communication apparatus 1300 by the VPN 1480. Although the communication apparatus 1350 is communicable with the communication line 290, the exchanging of electronic mails between the user terminals 180M and 180L and the mail server 150 is performed via the VPN 1480 and the communication apparatus 1300.

The user terminal 180M and the user terminal 180L are connected to the communication apparatus 1350 by the communication line 280B.

In each of the route storage module 1310A and the route storage module 1310B, a static route to the mail server 150 is registered.

For example, if the mail server 150 is to be used from the user terminal 180M, the mail server 150 is accessed via a route within the route storage module 1310B (i.e., via the VPN 1480). Then, in the communication apparatus 1300, the mail server 150 is accessed via a route within the route storage module 1310A (i.e., via the communication apparatus 1300 as a gateway). A route (10.10.10.10 via gateway) 1452 and a route (10.10.10.10 via VPN) 1454 are stored in the route storage module 1310A and the route storage module 1310B, respectively, in accordance with a route advertisement 1450.

Figure 15:
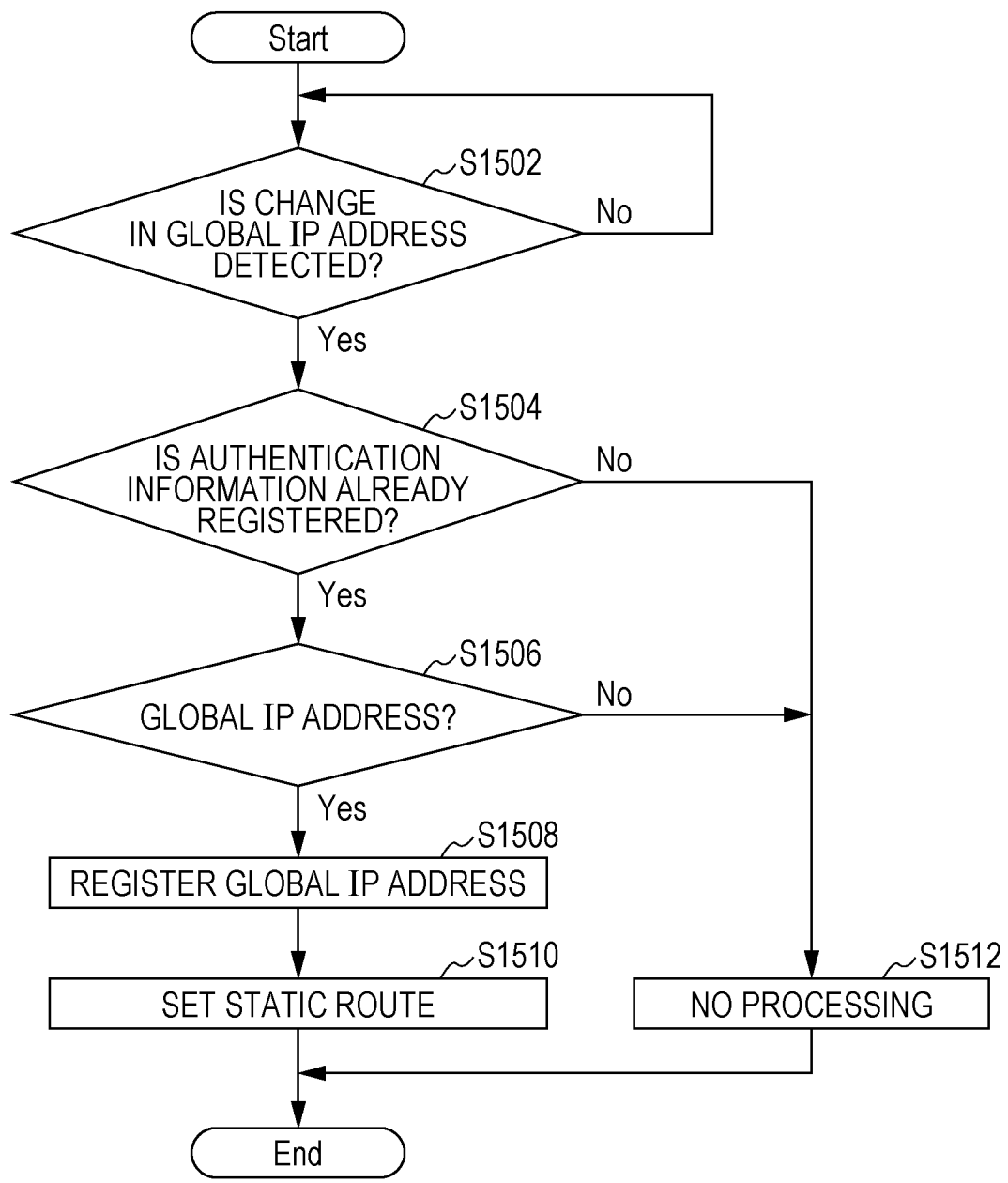
FIG. 15 is a flowchart illustrating an example of a process according to the third exemplary embodiment.

FIG. 15 is a flowchart illustrating an example of a process performed by the communication apparatus 1300 according to the third exemplary embodiment. In detail, this example relates to a setting process performed on the mail server 150 in accordance with a change in an allocated IP address of a PPPoE as an event. When performing the IP address-change setting process on the mail server 150, authentication information linked with the corporation is used.

In step S1502, the global-IP event detection module 110 determines whether or not a change in an IP address is detected. If a change is detected, the process proceeds to step S1504. Otherwise, the global-IP event detection module 110 waits until a change is detected.

In step S1504, the global-IP registration module 115 determines whether or not authentication information is already registered. If authentication information is already registered, the process proceeds to step S1506. Otherwise, the process proceeds to step S1512.

In step S1506, the global-IP event detection module 110 determines whether or not the changed IP address is a global IP address. If the changed IP address is a global IP address, the process proceeds to step S1508. Otherwise, the process proceeds to step S1512.

In step S1508, the global-IP registration module 115 registers the global IP address in the mail server 150.

In step S1510, the communication module (WAN) 105 sets a static route in the route storage module 1310A.

In step S1512, the global-IP registration module 115 does not perform any processing.

Figure 16:
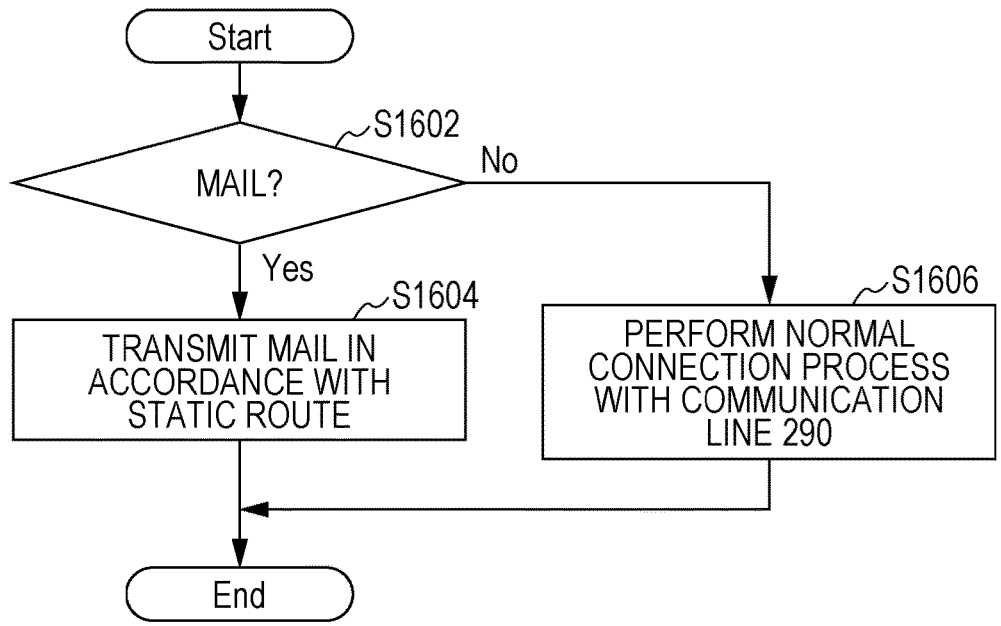
FIG. 16 is a flowchart illustrating an example of a process according to the third exemplary embodiment.

FIG. 16 is a flowchart illustrating an example of a process performed by the communication apparatus 1350 according to the third exemplary embodiment.

In step S1602, the communication module (WAN) 1305 determines whether or not the communication involves an electronic mail (i.e., whether or not the communication is with the mail server 150). If the communication involves an electronic mail, the process proceeds to step S1604. Otherwise, the process proceeds to step S1606.

In step S1604, the communication module (LAN) 1325 transmits information related to the electronic mail in accordance with a static route within the route storage module 1310B.

In step S1606, the communication module (WAN) 1305 performs a normal connection process with the communication line 290.

Figure 17:
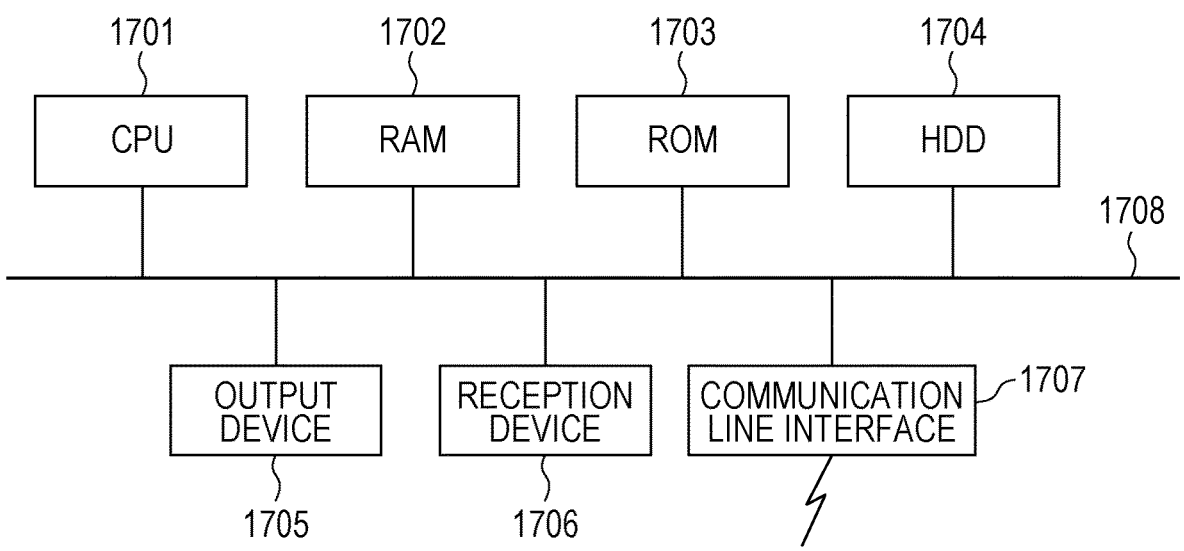
FIG. 17 is a block diagram illustrating an example of a hardware configuration of a computer that realizes each of the exemplary embodiments.

As shown in FIG. 17, a hardware configuration of a computer where a program according to each of the above exemplary embodiments (i.e., the communication apparatus 100, the mail server 150, the NAT 610, the communication apparatus 900, the mail server 950, the communication apparatus 1300, or the communication apparatus 1350) is executed is a normal computer, specifically, a personal computer or a computer that may serve as a server. In other words, as a specific example, a CPU 1701 is used as a processor (arithmetic unit), and a RAM 1702, a read-only memory (ROM) 1703, and an HDD 1704 are used as storage devices. As the HDD 1704, for example, a hard disk drive or a solid state drive (SSD), which is a flash memory, may be used. The computer is constituted of the CPU 1701, the RAM 1702, the ROM 1703, the HDD 1704, a reception device 1706, output device 1705, a communication line interface 1707, and a bus 1708. The CPU 1701 executes programs for, for example, the communication module (WAN) 105, the global-IP event detection module 110, the global-IP registration module 115, the communication module (LAN) 125, the mail-protocol processing module 155, the global-IP registration reception module 165, the NAT address registration module 910, the communication module (WAN) 1305, and the communication module (LAN) 1325. The RAM 1702 stores the programs and data. The ROM 1703 stores a program for activating the computer. The HDD 1704 as an auxiliary storage device functions as the authentication-information storage module 120, the transmission/reception-permitted-IP storage module 160, and the route storage modules 1310. The reception device 1706 receives data based on a user operation (including movement, sound, and visual line) performed on a keyboard, a mouse, a touchscreen, a microphone, or a camera (including a visual-line detection camera). The output device 1705 may be, for example, a cathode ray tube (CRT), a liquid crystal display, or a speaker. The communication line interface 1707 may be, for example, a network interface card for connecting to a communication network. The bus 1708 is for connecting these components and for exchanging data. Multiple computers of this type may be connected to each other by a network.

The above-described exemplary embodiments that are based on a computer program are each realized by causing a system having the above hardware configuration to load the computer program serving as software and by causing the software and the hardware resource to operate in cooperation with each other.

The hardware configuration shown in FIG. 17 indicates one configuration example. The exemplary embodiments are not limited to the configuration shown in FIG. 17, and an alternative configuration is permissible so long as the modules described in the exemplary embodiments are executable. For example, one or more modules may be constituted of dedicated hardware (such as an application specific integrated circuit (ASIC) or a field-programmable gate array (FPGA)), one or more modules may be located within an external system and be connected by a communication line, or multiple systems shown in FIG. 17 may be connected to each other by a communication line and operate in collaboration with each other. Furthermore, as an alternative to a personal computer, the system may be incorporated in, for example, a portable information communication device (including a portable telephone, a smartphone, a mobile device, and a wearable computer), a home information appliance, a robot, a photocopier, a facsimile apparatus, a scanner, a printer, or a multifunction apparatus (i.e., an image processing apparatus having any two or more functions among, for example, a scanning function, a printing function, a photocopying function, and a facsimile function).

Although POP3 and SMTP are used for transmitting and receiving electronic mails in each of the above exemplary embodiments, for example, IMAP may be used as an alternative.

Furthermore, the second exemplary embodiment and the third exemplary embodiment may be combined. In other words, in the third exemplary embodiment, if the NAT 610 is provided between the communication apparatus 1300 and the mail server 150 (communication line 290), the NAT address registration module 910 may be provided within the communication apparatus 1300.

The aforementioned program may be provided by being stored in a storage medium or may be provided via a communication unit. In that case, for example, the aforementioned program may be regarded as a "computer readable storage medium storing a program".

The term "computer readable storage medium storing a program" refers to a computer readable storage medium storing a program used for, for example, installing, executing, and distributing the program.

Examples of the storage medium include a digital versatile disc (DVD), a compact disc (CD), a Blu-ray Disc (registered trademark), a magneto-optical disk (MO), a flexible disk (FD), a magnetic tape, a hard disk, a read-only memory (ROM), an electrically erasable programmable read-only memory (EEPROM (registered trademark)), a flash memory, a random access memory (RAM), and a secure digital (SD) memory card. Examples of a DVD include a DVD-R, a DVD-RW, and a DVD-RAM, which are standards developed by DVD Forum, and a DVD+R and a DVD+RW, which are standards developed by DVD+RW Alliance. Examples of a CD include a compact disc read-only memory (CD-ROM), a compact disc recordable (CD-R), and a compact disc rewritable (CD-RW).

The aforementioned program may entirely or partially be stored in the storage medium for distribution or storage. Furthermore, the aforementioned program or a part thereof may be transmitted via a transmission medium, such as a wired network, a wireless network, or a combination of these networks, or may be transferred via a carrier wave. Examples of a wired network include a local area network (LAN), a metropolitan area network (MAN), a wide area network (WAN), the Internet, an intranet, and an extranet.

Furthermore, the aforementioned program may partially or entirely be another program, or may be stored in a storage medium together with a different program. Moreover, the aforementioned program may be stored in segments in multiple storage media. The aforementioned program may be stored in any state, such as a compressed state or an encrypted state, so long as the program is recoverable.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A communication apparatus that is connected to a communication line by using a dynamically-set global Internet-Protocol address, the communication apparatus comprising:
   a detector that detects a change in an Internet-Protocol address assigned to the communication apparatus; and
   a transmitting unit that
      transmits the changed Internet-Protocol address to a mail server when the detector detects the change in the Internet-Protocol address in response to a determination that the communication apparatus is connected to the mail server without a Network Address Translation device (NAT), so that the changed Internet-Protocol address is registered in an Internet-Protocol-address limiting function of the mail server, and
      does not transmit the changed Internet-Protocol address to the mail server in response to a determination that the communication apparatus is connected to the mail server via the NAT, wherein
   the changed Internet-Protocol address is the dynamically-set global Internet-Protocol address when the communication apparatus is connected to the mail server without the NAT, and
   the changed Internet-Protocol address is different from the dynamically-set global Internet-Protocol address when the communication apparatus is connected to the mail server via the NAT.

2. A communication system comprising:
   communication apparatus according to claim 1; and
   a mail server that includes a registration unit, wherein when the changed Internet-Protocol address is received from the communication apparatus, the registration unit registers the changed Internet-Protocol address, serving as a transmission source of the reception, in the Internet-Protocol-address limiting function.

3. A communication apparatus that is connected to a communication line by a router by using a dynamically-set global IP address, the router having a network address translation function, the communication apparatus comprising:
   a transmitting unit that transmits a communication including a predetermined Internet-Protocol address to a mail server at a predetermined interval so that the mail server registers a changed global Internet-Protocol address in an Internet-Protocol-address limiting function of the mail server in response to receiving the communication including the predetermined Internet-Protocol address, wherein
   the changed global Internet-Protocol address is different from the predetermined Internet-Protocol address.

4. A mail server comprising:
   a registration unit, wherein when the communication including the predetermined Internet-Protocol address is received from the communication apparatus according to claim 3, the registration unit registers, in the Internet-Protocol-address limiting function, the changed global Internet-Protocol address, and
   wherein the changed global Internet-Protocol address indicates a transmission source of the communication.

5. The communication apparatus according to claim 3, wherein an Internet-Protocol address not used as an actual Internet-Protocol address is used as the predetermined Internet-Protocol address.

6. A communication system comprising:
   communication apparatus according to claim 3; and
   a mail server comprising:
   a registration unit, wherein when the communication including the predetermined Internet-Protocol address is received from the communication apparatus, the registration unit registers the changed global Internet-Protocol address, serving as a transmission source of the reception, in the Internet-Protocol-address limiting function.

7. The communication system according to claim 2, further comprising:
   a second communication apparatus that is connected to the communication line by using a dynamically-set global Internet-Protocol address and that is connected to the communication apparatus by a virtual private network, the second communication apparatus including a communication unit that performs exchanging of an electronic mail between a mail client and the mail server via the communication apparatus by using the virtual private network.

8. The communication system according to claim 7, wherein the communication apparatus and the second communication apparatus perform the exchanging of the electronic mail between the mail client and the mail server via the communication apparatus by using a route advertising function.

9. A non-transitory computer readable medium storing a program causing a computer to execute a process, the computer being connected to a communication line by using a dynamically-set global Internet-Protocol address, the process comprising:

detecting a change in an Internet-Protocol address assigned to the computer;

transmitting the changed Internet-Protocol address to a mail server when the change in the Internet-Protocol address is detected in response to a determination that the computer is connected to the mail server without a Network Address Translation device (NAT), so that the changed Internet-Protocol address is registered in an Internet-Protocol-address limiting function of the mail server; and not transmitting the changed Internet-Protocol address to the mail server in response to a determination that the computer is connected to the mail server via the NAT, wherein the changed Internet-Protocol address is the dynamically-set global Internet-Protocol address when the computer is connected to the mail server without the NAT, and the changed Internet-Protocol address is different from the dynamically-set global Internet-Protocol address when the computer is connected to the mail server via the NAT.

* * * * *